US008026291B2

(12) United States Patent
Handa et al.

(10) Patent No.: US 8,026,291 B2
(45) Date of Patent: Sep. 27, 2011

(54) EXPANDED AND EXTRUDED POLYOLEFIN FOAMS MADE WITH METHYL FORMATE-BASED BLOWING AGENTS

(75) Inventors: Y. Paul Handa, Pittsford, NY (US); Gary A. Francis, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 149 days.

(21) Appl. No.: 11/677,371

(22) Filed: Feb. 21, 2007

(65) Prior Publication Data

US 2007/0213416 A1 Sep. 13, 2007

Related U.S. Application Data

(60) Provisional application No. 60/775,962, filed on Feb. 22, 2006.

(51) Int. Cl.
| | |
|---|---|
| C08J 9/16 | (2006.01) |
| C08J 9/18 | (2006.01) |
| B29C 44/34 | (2006.01) |
| C08F 110/00 | (2006.01) |
| C08F 36/00 | (2006.01) |

(52) U.S. Cl. ............ 521/60; 521/56; 521/142; 521/143; 521/150

(58) Field of Classification Search .................. 521/60, 521/50, 56, 142, 143, 150
See application file for complete search history.

(56) References Cited

U.S. PATENT DOCUMENTS

| | | | |
|---|---|---|---|
| 2,816,827 A | 12/1957 | Roth | |
| 2,861,898 A | 11/1958 | Platzer | |
| 2,911,382 A | 11/1959 | Barkhuff | |
| 2,983,962 A | 5/1961 | Merz | |
| 3,085,073 A | 4/1963 | Lintner | |
| 3,089,857 A | 5/1963 | Pottenger | |
| 3,281,259 A | 10/1966 | Lux et al. | |
| 3,290,198 A | 12/1966 | Lux et al. | |
| 3,358,060 A | 12/1967 | Ohsol | |
| 3,379,799 A | 4/1968 | Goldman | |
| 3,407,151 A | 10/1968 | Overcashier et al. | |
| 3,409,199 A | 11/1968 | Lake | |
| 3,577,360 A | 5/1971 | Immel | |
| 3,644,230 A | 2/1972 | Cronin | |
| 3,670,916 A | 6/1972 | Alpert | |
| 3,759,641 A | 9/1973 | Immel | |
| 3,855,377 A | 12/1974 | Uebelhart | |
| 3,864,444 A | 2/1975 | Johnson | |
| 3,900,433 A | 8/1975 | Taub et al. | |
| 3,914,191 A | 10/1975 | Scott | |
| 3,929,686 A | 12/1975 | Stevenson | |
| 3,961,000 A | 6/1976 | Ropiequet | |
| 3,962,154 A | 6/1976 | Egli | |
| 3,976,605 A | 8/1976 | Matsunaga et al. | |
| 4,009,976 A | 3/1977 | Johnson | |
| 4,033,010 A | 7/1977 | McCalla | |
| 4,033,910 A | 7/1977 | Papa | |
| 4,042,658 A | 8/1977 | Collins | |
| 4,098,941 A | 7/1978 | Johnson | |
| 4,104,440 A | 8/1978 | Collins | |
| 4,214,054 A | 7/1980 | Watanabe | |
| 4,272,469 A | 6/1981 | Smith | |
| 4,323,528 A | 4/1982 | Collins | |
| 4,557,881 A | 12/1985 | Rabotski | |
| 4,695,595 A | 9/1987 | Blount | |
| 4,769,396 A | 9/1988 | Blount | |
| 4,894,395 A * | 1/1990 | Park | 521/79 |
| 4,916,166 A | 4/1990 | Suh et al. | |
| 4,943,459 A | 7/1990 | Nedzu | |
| 4,960,804 A | 10/1990 | Doerge | |
| 4,997,858 A | 3/1991 | Jourquin et al. | |
| 5,026,736 A * | 6/1991 | Pontiff | 521/60 |
| 5,059,376 A * | 10/1991 | Pontiff et al. | 264/234 |
| 5,064,872 A | 11/1991 | Monstrey et al. | |
| 5,106,880 A | 4/1992 | Miller et al. | |
| 5,110,838 A | 5/1992 | Tokiwa et al. | |
| 5,120,481 A | 6/1992 | Brackman et al. | |
| 5,134,171 A | 7/1992 | Hammel et al. | |

(Continued)

FOREIGN PATENT DOCUMENTS

DE 4230097 5/1994

(Continued)

OTHER PUBLICATIONS

International Search Report for PCT/US2007/062492, filed Feb. 21, 2007, International Searching Authority, Alexandria, Virginia, Sep. 18, 2008.

(Continued)

*Primary Examiner* — Mark Eashoo
*Assistant Examiner* — Melissa Rioja
(74) *Attorney, Agent, or Firm* — Baker Botts LLP (57) ABSTRACT

Expanded and extruded polyolefin foams are obtained using environmentally benign non-VOC methyl formate as a blowing agent. The blowing agent can be a blend further including at least one co-blowing agent, preferably an environmentally friendly species (e.g., non-VOC), which is either a physical co-blowing agent (e.g. an inorganic agent, a hydrocarbon, a halogenated hydrocarbon, a hydrocarbon with polar, functional group(s) or any combination thereof), or a chemical co-blowing agent, or combinations thereof. The blowing agent blend can include any combination of methyl formate and one or more co-blowing agents. The polymer foam can include polyethylene, polypropylene or a combination thereof. The methyl formate-based blowing agent blends produce stable foams for various applications, including containers, packaging systems, as well as for insulation and protective cushioning. Processes for the preparation of such foams are also provided.

65 Claims, 4 Drawing Sheets

U.S. PATENT DOCUMENTS

| | | | |
|---|---|---|---|
| 5,149,473 A | 9/1992 | LeDuc | |
| 5,166,182 A | 11/1992 | Blanpied | |
| 5,210,108 A | 5/1993 | Spinu et al. | |
| 5,216,050 A | 6/1993 | Sinclair | |
| 5,225,490 A | 7/1993 | Tokiwa et al. | |
| 5,227,408 A | 7/1993 | Hanna et al. | |
| 5,242,494 A | 9/1993 | Callaghan et al. | |
| 5,252,642 A | 10/1993 | Sinclair et al. | |
| 5,283,003 A | 2/1994 | Chen | |
| 5,308,528 A | 5/1994 | Desbiendras et al. | |
| 5,336,696 A * | 8/1994 | Ashida | 521/113 |
| 5,348,983 A | 9/1994 | Sterzel | |
| 5,378,792 A | 1/1995 | Sterzel | |
| 5,391,335 A * | 2/1995 | Sakamoto et al. | 264/45.9 |
| 5,422,053 A | 6/1995 | Sterzel | |
| 5,437,924 A | 8/1995 | Decker et al. | |
| 5,439,947 A | 8/1995 | Bartlett et al. | |
| 5,447,962 A | 9/1995 | Ajioka et al. | |
| 5,478,494 A | 12/1995 | Lee et al. | |
| 5,532,284 A * | 7/1996 | Bartlett et al. | 521/134 |
| 5,563,180 A | 10/1996 | Skowronski et al. | |
| 5,565,497 A | 10/1996 | Godbey et al. | |
| 5,699,946 A | 12/1997 | Hashimoto et al. | |
| 5,736,586 A | 4/1998 | Bastioli et al. | |
| 5,750,584 A | 5/1998 | Knaus | |
| 5,759,569 A | 6/1998 | Hird et al. | |
| 5,763,518 A | 6/1998 | Gnatowski et al. | |
| 5,780,521 A | 7/1998 | Shmidt et al. | |
| 5,786,401 A | 7/1998 | Inagaki et al. | |
| 5,853,848 A | 12/1998 | Fisk | |
| 5,912,279 A | 6/1999 | Hammel et al. | |
| 5,922,348 A | 7/1999 | Wegner et al. | |
| 5,965,231 A | 10/1999 | Rotermund et al. | |
| 6,080,798 A | 6/2000 | Handa et al. | |
| 6,136,875 A | 10/2000 | Wu et al. | |
| 6,184,261 B1 | 2/2001 | Biby et al. | |
| 6,310,112 B1 | 10/2001 | Vo et al. | |
| 6,315,932 B1 | 11/2001 | Fujiwara et al. | |
| 6,355,341 B1 | 3/2002 | Chaudhary et al. | |
| 6,355,701 B1 | 3/2002 | Soukup et al. | |
| 6,395,791 B1 | 5/2002 | Chaudhary | |
| 6,476,080 B2 | 11/2002 | Duffy et al. | |
| 6,521,675 B1 * | 2/2003 | Wu et al. | 521/143 |
| 6,526,764 B1 | 3/2003 | Singh et al. | |
| 6,569,912 B1 | 5/2003 | Oohara et al. | |
| 6,599,946 B2 | 7/2003 | Duffy et al. | |
| 6,696,504 B1 | 2/2004 | Hayashi et al. | |
| 6,710,135 B2 | 3/2004 | Tan et al. | |
| 6,740,731 B2 | 5/2004 | Bigg et al. | |
| 6,753,357 B2 | 6/2004 | Kalinowski et al. | |
| 6,762,212 B2 | 7/2004 | Oohara et al. | |
| 6,841,581 B2 | 1/2005 | Hayashi et al. | |
| 7,045,556 B2 | 5/2006 | Handa et al. | |
| 7,166,248 B2 | 1/2007 | Francis et al. | |
| 7,358,282 B2 | 4/2008 | Krueger et al. | |
| 2002/0198273 A1 | 12/2002 | Nyberg et al. | |
| 2003/0078312 A1 | 4/2003 | Hibino et al. | |
| 2003/0114549 A1 | 6/2003 | Kalinowski et al. | |
| 2004/0006149 A1 | 1/2004 | Handa et al. | |
| 2004/0024077 A1 | 2/2004 | Braun et al. | |
| 2004/0132844 A1 | 7/2004 | Francis et al. | |
| 2005/0131094 A1 | 6/2005 | Kalinowski et al. | |
| 2005/0154114 A1 | 7/2005 | Hale | |
| 2006/0047009 A1 | 3/2006 | Handa et al. | |
| 2006/0052464 A1 | 3/2006 | Handa et al. | |
| 2006/0052465 A1 | 3/2006 | Handa et al. | |
| 2006/0052466 A1 | 3/2006 | Handa | |
| 2006/0091576 A1 | 5/2006 | Takase et al. | |
| 2006/0167122 A1 | 7/2006 | Haraguchi et al. | |
| 2006/0211782 A1 * | 9/2006 | Handa et al. | 521/79 |
| 2007/0004813 A1 | 1/2007 | Shelby et al. | |
| 2008/0146686 A1 | 6/2008 | Handa | |
| 2009/0012194 A1 | 1/2009 | Okuda et al. | |
| 2009/0234035 A1 | 9/2009 | Cheung et al. | |

FOREIGN PATENT DOCUMENTS

| | | |
|---|---|---|
| DE | 19824134 | 12/1999 |
| EP | 0377230 | 7/1990 |
| EP | 0450422 | 10/1991 |
| EP | 0 493 110 | 7/1992 |
| EP | 0657495 | 6/1995 |
| EP | 1975195 | 10/2008 |
| FR | 2 264 840 | 10/1975 |
| FR | 2264840 | 10/2005 |
| GB | 994074 | 6/1995 |
| JP | 6041344 | 2/1994 |
| JP | 2006328318 | 12/2006 |
| JP | 2006348060 | 12/2006 |
| KR | 100185251 | 5/1999 |
| WO | WO/91/13966 | 9/1991 |
| WO | WO/95/02000 | 1/1995 |
| WO | WO/2004/005382 | 1/2004 |
| WO | WO/2007/083705 | 7/2007 |
| WO | WO/2008/098888 | 8/2008 |

OTHER PUBLICATIONS

Cellular Materials, Encyclopedia of Polymer Science and Technology, J. Wiley and Sons, Article online, copyright 1999-2005.
U.S. Appl. No. 11/955,034, filed Dec. 12, 2007.
U.S. Appl. No. 10/934,832, filed Sep. 3, 2004.
U.S. Appl. No. 11/016,312, filed Dec. 17, 2004.
U.S. Appl. No. 11/122,158, filed May 3, 2005.
U.S. Appl. No. 11/151,814, filed Jun. 13, 2005.
U.S. Appl. No. 11/367,652, filed Mar. 3, 2006.
U.S. Appl. No. 11/680,170, filed Feb. 28, 2007.
U.S. Appl. No. 12/364,038, filed Feb. 2, 2009.
U.S. Appl. No. 12/048,467, filed Mar. 14, 2008.
U.S. Appl. No. 11/680,170, Response to Non-Final Rejection mailed on Dec. 14, 2009 filed Apr. 14, 2010.
U.S. Appl. No. 11/680,170, Non-Final Rejection mailed on Dec. 14, 2009.
U.S. Appl. No. 11/955,034, Response to Non-Final Rejection mailed on Dec. 14, 2009 filed Apr. 14, 2010.
U.S. Appl. No. 11/955,034, Non-Final Rejection mailed on Dec. 14, 2009.
U.S. Appl. No. 11/955,034, Response to Non-Final Rejection mailed on Apr. 14, 2009 filed Sep. 14, 2009.
U.S. Appl. No. 11/955,034, Non-Final Rejection mailed on Apr. 14, 2009.
U.S. Appl. No. 11/955,034, Request for Continued Examination filed on Mar. 11, 2009.
U.S. Appl. No. 11/955,034, Final Rejection mailed on Dec. 11, 2008.
U.S. Appl. No. 11/955,034, Response to Non-Final Rejection mailed on Jun. 24, 2008 filed Sep. 5, 2008.
U.S. Appl. No. 11/955,034, Non-Final Rejection mailed on Jun. 24, 2008.
U.S. Appl. No. 10/934,832, Respnse to Non-Final Rejection mailed on Apr. 17, 2007 filed on Jul. 17, 2007.
U.S. Appl. No. 10/934,832, Non-Final Rejection mailed on Apr. 17, 2007.
U.S. Appl. No. 10/934,832, Request for Continued Examination filed on Feb. 6, 2007.
U.S. Appl. No. 10/934,832, Final Rejection mailed on Aug. 10, 2006.
U.S. Appl. No. 10/934,832, Response to Non-Final Rejection mailed on Mar. 3, 2006 filed on Jun. 5, 2006.
U.S. Appl. No. 10/934,832, Non-Final Rejection mailed on Mar. 3, 2006.
U.S. Appl. No. 10/934,832, Response to Non-Final Rejection mailed on Sep. 28, 2005 filed on Dec. 12, 2005.
U.S. Appl. No. 10/934,832, Non-Final Rejection mailed on Sep. 28, 2005.
U.S. Appl. No. 11/016,312, Amendment after Notice of Allowance filed Oct. 30, 2007.
U.S. Appl. No. 11/016,312, Response to Non-Final Rejection mailed on Mar. 28, 2007 filed on Jul. 30, 2007.
U.S. Appl. No. 11/016,312, Non-Final Rejection mailed on Mar. 28, 2007.

U.S. Appl. No. 11/016,312, Response to Notice of Non-Compliant or Non-Responsive Amendment mailed on Dec. 5, 2006 filed on Jan. 2, 2007.

U.S. Appl. No. 11/016,312, Notice of Non-Compliant or Non-Responsive Amendment mailed on Dec. 5, 2006.

U.S. Appl. No. 11/016,312, Amendment After Final filed on Sep. 28, 2006.

U.S. Appl. No. 11/016,312, Request for Continued Examination filed on Sep. 15, 2006.

U.S. Appl. No. 11/016,312, Amendment After Final filed on Jun. 16, 2006.

U.S. Appl. No. 11/016,312, Final Rejection mailed on Mar. 16, 2006.

U.S. Appl. No. 11/016,312, Response to Non-Final Rejection mailed on Sep. 28, 2005 filed on Dec. 29, 2005.

U.S. Appl. No. 11/016,312, Non-Final Rejection mailed on Sep. 28, 2005.

U.S. Appl. No. 11/122,158, Non-Final Rejection mailed on Oct. 10, 2007.

U.S. Appl. No. 11/151,814, Non-Final Rejection mailed on Jan. 4, 2008.

U.S. Appl. No. 11/367,652, Non-Final Rejection mailed on Mar. 13, 2009.

U.S. Appl. No. 12/364,038, Final Rejection mailed on Mar. 24, 2010.

U.S. Appl. No. 12/364,038, Response to Non-Final Rejection mailed Dec. 21, 2009 filed Jan. 21, 2010.

U.S. Appl. No. 12/364,038, Non-Final Rejection mailed Dec. 21, 2009.

U.S. Appl. No. 12/364,038, Request for Continued Examination filed on Oct. 15, 2009.

U.S. Appl. No. 12/364,038, Response to Non-Final Rejection mailed Jun. 9, 2009 filed Jul. 22, 2009.

U.S. Appl. No. 12/364,038, Non-Final Rejection mailed Jun. 9, 2009.

Mohamed et al., "Polycaprolactone/polystyrene bioblends characterized by thermogravimetry, modulated differential scanning calorimetry and infrared photoacoustic spectroscopy," Polymer Degradation and Stability, vol. 92, Issue 7, Jul. 2007, pp. 1177-1185.

de Carvalho et al., "Polyhydroxybutyrate/acrylonitrile-g-(ethylene-co-propylene-co-diene)-g-styrene blends: Their morphology and thermal and mechanical behavior," Journal of Applied Polymer Science, vol. 110 Issue 2, pp. 880-889, Jul. 10, 2008.

Narayan Ramani, "Biobased & Biodegradable Plastics 101," Chemical Engineering & Materials Science.

Nangeroni J. (Oct. 2007). Foam Extrusion and Thermoforming of NatureWorks® BioPolymer. Presented at Polymer Foams 2007, organized by Applied Market Information LLC, Newark, NJ.

Flieger M et al., "Biodegradable Plastics from Renewable Sources," Folia Microbiol. (2003);48(1):27-44.

Cereplast unveils breakthrough bio-based formable resin, Jun. 22, 2009, www.plastemart.com.

U.S. Appl. No. 11/680,170, Jan. 3, 2011 Filed Request for Continued Examination (RCE).

U.S. Appl. No. 11/680,170, Oct. 1, 2010 Final Office Action.

U.S. Appl. No. 12/048,467, Mar. 28, 2011 Response to Final Office Action.

U.S. Appl. No. 12/048,467, Jan. 28, 2010 Final Office Action.

U.S. Appl. No. 12/048,467, Nov. 23, 2010 Response to Non-Final Office Action.

U.S. Appl. No. 12/048,467, Jul. 23, 2010 Non-Final Office Action.

European Search Report issued on Feb. 2, 2011 in application No. 10183423.2 (corresponding to US 7,307,105).

U.S. Appl. No. 11/955,034, Final Rejection mailed on Jul. 21, 2010.

U.S. Appl. No. 11/680,170, Response to Restriction Election Requirement mailed on Jun. 24, 2010 filed on Jul. 21, 2010.

U.S. Appl. No. 11/680,170, Restriction Election Requirement mailed on Jun. 24, 2010.

U.S. Appl. No. 12/048,467, Non-Final Rejection mailed Jul. 23, 2010.

U.S. Appl. No. 12/364,038, Amendment after Non-Final Rejection filed Aug. 5, 2010.

* cited by examiner

EXPANDED AND EXTRUDED POLYOLEFIN FOAMS MADE WITH METHYL FORMATE-BASED BLOWING AGENTS

CROSS REFERENCE TO RELATED APPLICATIONS

This application claims the benefit of U.S. provisional patent application No. 60/775,962 filed on Feb. 22, 2006, the contents of which are expressly incorporated herein by reference thereto.

FIELD OF INVENTION

The present invention relates generally to polyolefin foams using environmentally benign blowing agents, and processes of making the same. Particularly, the present invention relates to dimensionally stable polyolefin foams made using methyl formate-based blowing agents, and processes of making the same. The polyolefin foams are particularly suitable for various packaging applications in the form of expanded beads or extruded sheets and boards and the articles made therefrom.

BACKGROUND OF THE INVENTION

Foams made from alkenyl aromatic polymers (e.g, polystyrene) or polyolefin polymers (e.g. polyethylene and polypropylene) have found extensive use, particularly as packaging, protective, and insulating materials. Polyolefin foams are particularly advantageous due to their tolerance to high service temperatures. Polyolefin foams are commonly manufactured as expanded beads, extruded sheets or extruded boards. The difference between the expanded and extruded foams is that the extruded foams, in the form of continuous sheets or boards, are made in a single-step process; whereas, expanded foams, in the form of discrete, small-size pieces, are made in a multi-step process. Thus, the dimensions of expanded foam are much smaller than those of extruded foam. Furthermore, the expanded foams do not necessarily have to be in the form of beads or peanuts, but can also be made from pellets, rods, platelets, thin sheet or film. For the sake of convenience, the term "bead" or "pellets" will be used throughout this application to imply other shapes in which small, discrete particles of the polymer resin can be used to make expanded foams.

Generally, polyolefin foams in the form of beads or sheets having a thickness of less than about one-half inch can be used to make packaging materials such as containers (cups, bowls, clamshells, picnic chests) for hot or cold beverages or food whereby the beads are fused or the sheet is thermoformed in a mold to form the packaging material of a desired shape. Such foams are also used as protective and cushioning materials for transportation of delicate or shock sensitive articles whereby the foam beads can be used as loose fill dunnage material and thin sheets can be used to provide protective wrapping.

Packaging and insulation foam products with a thickness greater than about 0.5 inch are called planks or boards. Such foam boards are produced in the desired shape and size by direct extrusion and cutting if needed, or by fusing the expanded foam beads. The foam boards can be used for protective packaging by die-cutting the boards to various shapes, for insulation, for dissipating mechanical energy as in automotive parts, or for cushioning floats. It is desirable that the polyolefin foams used in such diverse applications be dimensionally stable; this characteristic is even more desirable for planks or boards.

These and other polymer foams are commonly made using a continuous process where a blowing agent laden molten resin is extruded under pressure through an appropriate die into a lower pressure atmosphere. Alternatively, a batch or staged process can be used, where small polymer beads (also called particles or pellets) are impregnated with blowing agent and then expanded by heating rapidly to a temperature near or above the glass-transition or crystal-melt temperature of the polymer-blowing agent system, or subjected to an external compressive stress at a temperature up to the glass-transition or crystal-melt temperature of the polymer-blowing agent system. Presently, physical blowing agents more commonly used for making polyolefin foams are hydrocarbons, chlorinated hydrocarbons, hydrochlorofluorocarbons, hydrofluorocarbons, or combinations thereof. Hydrocarbons with three or more carbon atoms are considered volatile organic compounds (VOCs) that can lead to formation of smog. Furthermore, some halogenated hydrocarbons are either VOCs or may have high ozone depletion potential (ODP) or global warming potential (GWP), or may be hazardous air pollutants (HAPs) and, at times, may fall into more than one of these categories. Therefore, the use of hydrocarbon and halogenated hydrocarbon blowing agents for preparing polymeric foams is not preferred environmentally and imposes many limitations on the manufacturing process, thus complicating and significantly increasing the cost of manufacturing. For example, polyolefin foams (beads or sheets) are generally made using VOCs such as butanes or compounds such as halogenated hydrocarbons that are HAPs and/or may have high ODP and/or may have high GWP. It is therefore desirable to minimize or eliminate altogether the use of such compounds as blowing agents for preparing polyolefin foams.

Methyl formate is classified as a non-VOC (Federal Register, Volume 69, Number 228, Nov. 29, 2004), is non-HAP, has zero ODP, and negligible GWP. U.S. Pat. No. 6,753,357 to Kalinowski et al., which is incorporated in its entirety herein by reference thereto, describes the use of methyl formate to produce stable, rigid isocyanate/polyol based polyurethane foams. It is noted, however, that such polyurethane foams are thermoset, so as to be made via a cross-linking and curing process. The dimensional stability or instability imparted to the final polyurethane foam product by the nature of the blowing agent therefore is quite different than in the case of polyolefin foams.

U.S. Pat. No. 3,407,151 to Overcashier et al., which is incorporated in its entirety herein by reference thereto, is directed to the production of expanded or expandable thermoplastic materials, particularly crystalline polypropylene, using an insoluble volatile liquid. The process involves the production of a substantially uniform dispersion of fine, discrete masses of blowing agent in a matrix of melted polymer, and extrusion and cooling of the dispersion without substantial coagulation of the fine masses. Methyl formate is included in a list of possible volatile liquids that can be used in this process. Further, Overcashier discloses the use of a single, insoluble liquid and does not disclose or suggest the use of liquid blends.

U.S. Pat. No. 3,976,605 to Matsunaga et al., which is incorporated in its entirety herein by reference thereto, is directed to a foamed plastic of a resin composition including a pullulan type resin and thermoplastic resin. The pullulan resin is a high-molecular weight linear polymeric glucose, having a molecular weight of 10,000 to 5,000,000. The pullulan resin includes both an etherified pullalan and an esterified pullalan. Methyl formate is included in a list of possible volatile liquid foaming agents suitable for use in this process, particularly as an example of a suitable low boiling ester.

U.S. Pat. No. 3,281,259 to Lux et al., which is incorporated in its entirety herein by reference thereto, is directed to a process for rendering the surface of a polyethylene foam sheet printable or receptive to coating by another polymer by creating open cells in the surface of the solid or foamed polyolefin. The process can include i) heating the surface of the foam sheet to produce a surface permeated by a large number of very fine pores; ii) chilling the surface of a foamed polyolefin to produce an unfoamed polyethylene "skin", which is then rapidly heated to a high enough temperature to create open cells in the surface layer only; or iii) passing a conventional closed cell foamed polyolefin sheet under a microprecision surface grinder so that only the surface layer of polymer is ground away leaving exposed open fragments of bubbles on the surface of the skin. Methyl formate is included in a list of possible volatile liquid foaming agents that can be used in this process.

U.S. Pat. No. 5,026,736 to Pontiff et al., which is incorporated in its entirety herein by reference thereto, is directed to moldable shrunken foam beads. The beads are produced by extruding a mixture of a thermoplastic foamable polymer and a blowing agent, cutting the melt to form foam beads, allowing the beads to shrink to a predetermined density, and, optionally, treating the beads to crosslink the thermoplastic polymer foam by chemical means or electromagnetic radiation. Through proper choice of blowing agents and gas permeation modifiers, the foam beads typically shrink within about 15 minutes after extrusion and cutting. The "shrunken" beads are thus defined as being reduced from their maximum expansion to produce surface wrinkles, dimples or the like. The shrinkage occurs because of the blowing agent's rapid diffusion from the foam structure relative to its replacement with air and/or the low room temperature vapor pressure of the blowing agent, which causes a decrease in the volume of the cells as cooling progresses. Methyl formate is included in a list of possible volatile organic blowing agents that can be used in this process.

U.S. Pat. No. 5,059,376 to Pontiff et al., which is incorporated in its entirety herein by reference thereto, is directed to a process for accelerated removal of residual blowing agents from objects produced from foamed thermoplastic polymers. The process involves subjecting the extruded foam to an elevated temperature to remove a substantial portion of the residual blowing agent and to cause sufficient air to diffuse into the foam so as not to cause substantial collapse of the foam. The foam sheets used in the process described in Pontiff are generally 0.25 inch thick or less. Methyl formate is included in a list of possible volatile organic blowing agents that can be used to produce the polyolefin foams used in the process. The amount of residual blowing agent remaining in the foam after the process will vary with the various blowing agents used, but generally will be less than two weight percent of the foam product.

U.S. Pat. No. 5,391,335 to Sakamoto et al., which is incorporated in its entirety herein by reference thereto, is directed to a process for producing an insulated electric wire having an insulated layer made of a polyolefin foam. The foaming agent is a mixture of at least two compounds, one compound including the group consisting of ethers, esters, ketones and saturated hydrocarbons having boiling points of 100° C. or below and at least one additional liquid compound selected from the group consisting of ethers, esters, ketones, saturated hydrocarbons and alcohols having boiling points higher than 100° C. but not exceeding 150° C. The molten mixture, consisting of resin, blowing agents and additives, is extruded from the die into a cross-head portion which has a conductor-wire continuously guided therein. This allows the molten mixture to coat the periphery of the conductor and foam into a foam-insulating layer.

U.S. Pat. No. 5,565,497 to Godbey et al., which is incorporated in its entirety herein by reference thereto, is directed to a process for the manufacture of a closed cell, rigid, polymer foam which contains a well-dispersed filler. A non-ionic fluorochemical surfactant is used in the formulation to help disperse the filler in order to improve the insulation value of the foam. The filler material may include a variety of inert, non-reactive substances, including particulate clays, carbons, metals, minerals, polymeric materials and diverse chemical compounds and mixtures thereof. Methyl formate is included in a list of possible volatile organic blowing agents that can be used to produce the polyolefin foams used in the this process.

Therefore, a need exists for blowing agents employing methyl formate and environmentally friendly co-blowing agents, preferably non-VOC co-blowing agents, as components of the blowing agent blend to produce stable polyolefin foams, without compromising the product quality in terms of appearance, mechanical or compressive strength, and that enable a cost-effective and versatile manufacturing process.

SUMMARY OF THE INVENTION

According to one embodiment of the present invention, a preferred blowing agent for making polyolefin foams is methyl formate. The blowing agent can be a blend further including at least one co-blowing agent. In accordance with a preferred embodiment of the invention, the blowing agent blend is substantially miscible with the polymer. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. The foam can be an expanded polyolefin foam structure or an extruded polyolefin foam structure, either of which can be used as packaging, protective, and insulation foams. The blowing agent can be 100% methyl formate, or the blowing agent can be a blend including any combination of methyl formate and one or more co-blowing agents. The preferred co-blowing agent is an inorganic agent such as carbon dioxide, water, nitrogen, argon; a hydrocarbon, more preferably a hydrocarbon containing two to five carbon atoms such as ethane, propane, n-butane, isobutane, isopentane; a halogenated hydrocarbon such as 1,1-difluoroethane (HFC-152a), 1,1,1,2-tetrafluoroethane (HFC-134a), trans-1,2-dichloroethylene, 1,1,1,3,3-pentafluoropropane (HFC-245fa); an ether such as dimethyl ether; or any combination thereof.

According to another embodiment, a polyolefin foam structure is prepared by an extrusion process comprising a polyolefin and a blowing agent blend. The polyolefin foam structure is prepared by melting a polyolefin, mixing (e.g., dissolving, impregnating or entrapping) an effective amount of blowing agent blend, and extruding the compressed mixture through an appropriate die into a low pressure zone to form a foam sheet or a board. The blowing agent blend can include 100 percent methyl formate. Alternatively, the blowing agent blend can include methyl formate and at least one co-blowing agent. In accordance with a preferred embodiment of the invention, the blowing agent blend is substantially miscible with the polymer. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water, or any combination thereof), a chemical co-blowing agent, or combinations thereof. The preferred co-blowing agent is an inorganic agent such as carbon dioxide, water, nitrogen, argon; a hydrocarbon, more preferably a hydrocarbon containing two to five carbon atoms such as ethane, propane, n-butane, isobutane, isopentane; a halogenated hydrocarbon such as 1,1-difluoroethane (HFC-152a), 1,1,1,2-tetrafluoroethane (HFC-134a), trans-1,2-dichloroethylene, 1,1,1,3,3-pentafluoropropane (HFC-245fa); an ether such as dimethyl ether; or any combination thereof. In a preferred embodiment, the polyolefin includes polyethylene, polypropylene, or a combination thereof. Generally, the foam sheets have a thickness of less than about 0.5 inch; and the foam boards have a thickness of at least about 0.5 inch, preferably about 0.5 inch to about 3 inch.

According to yet another embodiment, a polyolefin foam structure is prepared is from an expandable polyolefinic formulation including a polyolefin and a blowing agent, the blowing agent blend including methyl formate. In accordance with a preferred embodiment of the invention, the blowing agent blend is substantially miscible with the polymer. In one aspect of this embodiment, the polyolefin foam structure is prepared by melting a polyolefin, mixing (e.g., dissolving, impregnating or entrapping) an effective amount of blowing agent, and extruding the compressed mixture through an appropriate die into a low pressure zone to form a foam sheet or a board, or into a low temperature zone at a quench temperature to form expandable beads. In another aspect of this embodiment, the expandable beads are prepared by dissolving an effective amount of blowing agent into the polyolefin polymer. In a further aspect, the expandable beads are prepared by synthesizing the polymer in the presence of the blowing agent so as to dissolve, impregnate or entrap the blowing agent in the polymer. The polymer can be in the form of pellets, preferably of size about 0.05 inch×0.05 inch, beads or particles. The expanded foam structure is then obtained by rapidly heating the expandable formulation to a temperature near or above the glass-transition or crystal-melt temperature of the polymer-blowing agent system, to form foamed beads, which can be used as such or further compression molded into desired shapes and thickness. In yet another further aspect, the expanded foam structure is obtained by subjecting the beads to an external compressive stress at a temperature up to the glass-transition or crystal-melt temperature of the polymer-blowing agent system. A preferred blowing agent for making the polyolefin foam structure is methyl formate. The blowing agent can be a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, water, or any combination thereof), a chemical co-blowing agent, or combinations thereof. The polyolefin foam can be an expanded polyolefin foam structure or an extruded polyolefin foam structure, either of which can be used as packaging, protective, and insulation foams. The blowing agent can be 100% methyl formate, or the blowing agent can be a blend including any combination of methyl formate and one or more co-blowing agents. The preferred co-blowing agent is an inorganic agent such as carbon dioxide, water, nitrogen, argon; a hydrocarbon, more preferably a hydrocarbon containing two to five carbon atoms such as ethane, propane, n-butane, isobutane, isopentane; a halogenated hydrocarbon such as 1,1-difluoroethane (HFC-152a), 1,1,1,2-tetrafluoroethane (HFC-134a), trans-1,2-dichloroethylene, 1,1,1,3,3-pentafluoropropane (HFC-245fa); an ether such as dimethyl ether; or any combination thereof. In a preferred embodiment, the polyolefin includes polyethylene, polypropylene, or a combination thereof. Generally, the foam sheets or beads have a thickness of less than about 0.5 inch; and the foam boards have a thickness of at least about 0.5 inch, preferably about 0.5 inch to about 3 inch.

The polyolefin foam structure obtained by the process of the present invention preferably is a substantially closed-cell and dimensionally-stable structure. The inventive formulations and methods of the present invention employ blowing agents containing environmentally benign non-VOC and non-HAP species, and thus offer significant advantages as compared with presently used blowing agents.

While the invention is capable of various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Reference will now be made in detail to the present preferred embodiments of the invention, an example of which is illustrated in the accompanying drawings. The method and corresponding steps of the invention will be described in conjunction with the detailed description of the compositions.

The methods and compositions presented herein may be used for the manufacture of foam beads, sheets, boards or planks. The present invention is particularly suited for a blowing agent composition having reduced ozone formation or depletion potential and negligible global warming potential.

In accordance with the present invention, stable thermoplastic foams are achieved using blowing agents that are environmentally benign.

The effectiveness of a blowing agent depends on its solubility in the polymer and its ability to expand the polymer-blowing agent solution when such a solution is subjected to thermodynamic instability such as, for example, when the solution exits a die attached to an extruder (to provide the extrudate) or when the blowing agent laden polymer is rapidly heated. The expansion of the polymer-blowing agent solution depends on the difference between the glass transition temperature of the polymer Tg and the boiling point of the blowing agent Tb. In general, the solubility of the blowing agent in the polymer depends on the difference between Tg and Tb (Tg−Tb); the smaller the difference the higher the solubility. In the case of semi-crystalline polymers such as polyolefins, the characteristic temperature governing expandability is the crystal melting temperature Tm, and that governing blowing agent solubility is (Tm−Tb). Since volatility follows an inverse relationship with Tb, it is understood that at the same conditions of temperature and pressure, a higher volatility blowing agent will have lower solubility compared to a lower volatility blowing agent. As such, by blending a lower volatility blowing agent with a higher volatility blowing agent, a foaming formulation with optimized solubility and expandability characteristics can be developed. Furthermore, by blending a currently used VOC or HAP blowing agent with a non-VOC and non-HAP blowing agent of similar volatility, the emissions can be reduced without sacrificing the solubility and expandability characteristics.

The foams and processes of the present invention employ blowing agent(s) to achieve a dimensionally stable polyolefin foam. The preferred blowing agent used in the present invention includes methyl formate, which is non-VOC and non-HAP, and has zero ODP and negligible GWP. Hence, eliminating HAPs and minimizing the propensity to smog formation from the manufacturing process and the foam resulting therefrom is not only environmentally friendly, but also avoids many of the disadvantages of certain blowing agent compositions and processes currently employed. Thus, methyl formate alone or in combination with one or more suitable blowing agents having similar environmental attributes can help offset the harmful environmental impacts (ODP, HAP, VOC) associated with the blowing agents in current use. In accordance with a preferred embodiment of the invention, the blowing agent blend is substantially miscible with the polymer.

Resins that can be foamed in accordance with the present invention include polyolefin polymers, which can be linear, branched, or cross-linked, and can be derived from aliphatic or cycloaliphatic 1-olefins. Suitable polyolefins include homopolymers and blends thereof, copolymers of olefinic compounds and copolymerizable olefinic monomers. Most commonly used polyolefins are based on ethylenic and/or propylenic moieties. The ethylenic polymer material can further include minor proportions of non-ethylenic polymers. The ethylenic polymer material can be comprised solely of one or more ethylenic homopolymers, one or more ethylenic copolymers, a blend of one or more of each of ethylenic homopolymers and copolymers, or blends of any of the foregoing with a non-ethylenic polymer. Regardless of composition, the ethylenic polymer material preferably includes greater than 50 weight percent, and more preferably greater than 70 weight percent of ethylenic monomeric units. Most preferably, the ethylenic polymer material is comprised completely of ethylenic monomeric units. Most preferred ethylenic polymers are polyethylene homopolymers. Polyethylenes can be of the high, medium, low, linear low, or ultra-low density type. Most preferred are low density polyethylenes. The polyethylenes can be linear, branched or cross-linked. Virgin polyethylene resin can be combined with recycled polyethylene from post-industrial or post-consumer sources or can be combined with offgrade virgin polyethylene.

Suitable ethylenic copolymers can be comprised of ethylenic monomeric units and minor amounts, preferably 20 weight percent or less, of a monoethylenically unsaturated monomeric unit or units copolymerizable therewith. Suitable comonomers include $C_1$-$C_4$ alkyl acids and esters, ionomeric derivatives, $C_4$-$C_6$ dienes and $C_3$-$C_9$ olefins. Examples of suitable comonomers include, but are not limited to, acrylic acid, itaconic acid, maleic acid, methacrylic acid, ethacrylic acid, methyl acrylate, methyl methacrylate, ethyl acrylate, vinyl acetate, maleic anhydride, acrylonitrile, propylene, isobutylene, and butadiene.

Suitable propylenic polymer material that can be used in the present invention includes polypropylene homopolymer or copolymers. Propylene copolymers include random and block copolymers of propylene and an olefin such as ethylene, $C_4$-$C_{10}$ dienes, and random terpolymers of propylene with other non-propylenic, linear or branched 1-olefins. Propylene polymer may comprise of one or more propylene homopolymer, one or more propylene copolymers, or copolymerized with other olefinic monomers, a blend of one or more homopolymers and copolymers, or blends of any of the propylene polymer with non-propylene polymers such as polyethylenes, polybutylenes, olefinic rubbers, and ionomers. The propylene polymer content in such blends is preferably greater than 50 weight percent, more preferably greater than 75 weight percent, and a majority of the propylene polymer should be high melt strength polymer. Various polypropylene polymers that are suitable in the present invention include, but are not limited to, atactic, isotactic, syndiotactic, and long-chain branched polypropylenes. The polypropylenes can be linear, branched or cross-linked. The polypropylene resin can be further combined with suitable amounts of recycled polypropylene from post-consumer or post-industrial sources or with offgrade virgin polypropylene.

Similar considerations apply to polyolefins other than polyethylene or polypropylene, such as polyisobutylenes, poly(4-methyl-1-pentene) or polymers made from higher olefins, any one or more of which can be used to prepare the polyolefin foam structures of the present invention.

A preferred resin composition includes low density polyethylene and high melt strength polypropylene because of the favorable melt extensibility imparted to these polymers via long chain branching. These high melt strength resins tend to be more expensive than their low melt strength counterparts. Suitable, expandable formulations employing low melt strength polyolefins can be obtained by inducing light cross-linking or branching by using azido or vinyl silanes, organic peroxides, multifunctional vinyl monomers, or radiation, or by blending high and low melt strength resins using coupling or bridging agents such as poly(sulfonyl azide) or compatibilizers such as maleic anhydride grafted polyolefins or alkenyl aromatic polymers. Such coupling and compatibilizing agents allow blending polyolefins with non-polyolefin polymers. Further examples of the various polyolefins that can be formulated for making foams and methods of modifying the melt strength of a polyolefin or its blends with other polyolefin or non-polyolefin polymers via use of cross-linking or coupling agents are disclosed in U.S. Pat. No. 6,395,791 to Chaudhary, which is expressly incorporated herein by reference in its entirety. In accordance with a preferred embodiment of the invention, the resin composition does not include a pullulan type resin, and, more preferably does not include a pullulan type resin having a molecular weight from 10,000 to 5,000,000. A pullulan resin is a high molecular weight linear polymer wherein units of maltotriose, which is a trimer of glucose, have been repeatedly bonded through α-1,6 linkages which are different from those of the trimer.

The blowing agent includes from about 1 weight percent to about 100 weight percent methyl formate. In one embodiment, the blowing agent includes 100 weight percent methyl formate. In another embodiment, however, the blowing agent is a blend including less than 100 weight percent methyl formate, and further including at least one co-blowing agent.

It is contemplated that more than one co-blowing agent can be employed in the blowing agent blend. In accordance with a preferred embodiment of the invention, the blowing agent blend is substantially miscible within the polymer. Such co-blowing agent(s) can be physical, chemical or combinations thereof. The composition of the blowing agent blend depends on the foamed structure being prepared. In one embodiment, when the foamed structure is a sheet, a board or plank, or expandable bead, the blowing agent blend includes from about 1 weight percent to about 100 weight percent methyl formate. In another embodiment, however, when the foamed structure is a sheet, a board or plank, or an expandable bead, the blowing agent blend includes from about 1 weight percent to about 99 weight percent methyl formate, and at least one co-blowing agent. Such co-blowing agent(s) can be physical, chemical or combinations thereof. The co-blowing agent generally is either fast expanding or has similar expansion characteristics as compared to pure methyl formate. The co-blowing agent can be an organic compound or an inorganic compound. Preferably, the co-blowing agent is a non-VOC. Some non-limiting examples of physical co-blowing agents include, but are not limited to, inorganic agents, organic agents (e.g. hydrocarbons, halogenated saturated or unsaturated hydrocarbons, ethers, esters, acetals, alkanols, carbonates, amines and ketones), or any combination thereof.

Some suitable inorganic physical blowing agents include, but are not limited to, carbon dioxide, water, air, nitrogen, argon, xenon, sulfur hexafluoride, nitrous oxide, ammonia, silicon tetrafluoride, nitrogen trifluoride, boron trifluoride, and boron trichloride, or any combination thereof. In one currently preferred embodiment, the inorganic agent is an inorganic gas such as carbon dioxide, nitrogen, argon, air and the like. A currently preferred inorganic gas is carbon dioxide. In another currently preferred embodiment, the inorganic agent is water.

Some examples of organic physical co-blowing agents that can be used in the present invention include, but are not limited to, hydrocarbons, halogenated hydrocarbons, fluids with polar groups such as ethers, esters, acetals, carbonates, alkanols, amines and ketones, and combinations thereof. Examples of hydrocarbons include, but are not limited to, methane, ethane, propane, cyclopropane, normal- or iso-butane, cyclobutane, neopentane, normal- or iso-pentane, and cyclopentane or any combination thereof. Examples of currently preferred halogenated saturated hydrocarbons include, but are not limited to, methyl fluoride, difluoromethane (HFC-32), trifluoromethane (HFC-23), perfluoromethane, chlorodifluoromethane (HCFC-22), methylene chloride, ethyl chloride, ethyl fluoride, 1,2-difluoroethane (HFC-152), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124), isopropyl chloride, difluoropropane, 1,1,1-trifluoropropane, 1,1,1,3,3-pentafluoropropane (HFC-245fa), 1,1,1,2,3,3-hexafluoropropane (HFC-236ea), 1,1,1,2,3,3,3-heptafluoropropane (HFC-227ea), perfluoropropane, 2,2,4,4,4-pentafluorobutane (HFC-365mfc), perfluorobutane, perfluorocyclobutane, and vinyl fluoride, or any combination thereof. Examples of currently preferred halogenated unsaturated hydrocarbons include, but are not limited to, trans-1,2-dichloroethylene, 1,1,1,2-tetrafluoropropene, and 1,1,1,2,3-pentafluoropropene. Fluids with polar groups include but are not limited to ethers such as dimethyl ether, vinyl methyl ether, methyl ethyl ether, dimethyl fluoroether, diethyl fluoroether, and perfluorotetrahydrofuran; amines such as dimethylamine, trimethylamine and ethylamine; ketones such as acetone and perfluoroacetone; esters such as ethyl formate and methyl acetate; acetals such as methylal; carbonates such as dimethyl carbonate; alkanols such as ethanol and isopropanol, or any combination thereof.

Chemical co-blowing agents are compounds which undergo a chemical reaction, for example decomposition to form an inorganic gas such as $CO_2$ or $N_2$ and CO. Non-limiting examples of suitable chemical co-blowing agents include azodicarbonamide, azodiisobutyronitrile, benzenesulfonylhydrazide, 4,4'-oxybis(benzene sulfonylhydrazide), p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. There are also various acid/bicarbonate mixtures that decompose into gases when heated. For example, mixtures of citric acid and sodium bicarbonate sold under the name HYDROCEROL® can be employed as chemical co-blowing agents.

The total amount of the blowing agent in the polymeric formulation used to prepare the polyoelfin foam structures depends on conditions such as temperature and pressure under which the blowing agent is dissolved in the polymer, the chemical and thermophysical characteristics of the blowing agent being used, and the desired density and associated properties such as insulation value, weight to strength ratio, compressive strength, etc. of the foamed article. The foaming or expandable formulation is defined herein as including the blowing agent(s), polymer resin(s), and any additives. For a foam having a density of from about 1 to about 15 $lb/ft^3$, the formulation typically includes from about 18 to about 1 weight percent of blowing agent.

The blowing agent used in the present invention includes 100% methyl formate, or the blowing agent can be a blend including 99 weight percent or less methyl formate in combination with one or more co-blowing agent(s), which can be a physical co-blowing agent, a chemical co-blowing agent, or a combination thereof. The blowing agent blend generally includes from about 1 weight percent to about 99 weight percent methyl formate, for example from about 5 weight percent to about 75 or 80 weight percent methyl formate, or from about 20 weight percent to about 80 or 85 weight percent methyl formate. The blowing agent blend more typically includes from about 20 or 25 weight percent to about 60 weight percent methyl formate. More specifically, the blowing agent blend preferably includes from about 20 or 25 weight percent to about 50 weight percent methyl formate.

If provided, the blowing agent blend generally includes at least about 20 or 25 weight percent of co-blowing agent(s). The blowing agent blend more typically includes from about 80 or 75 weight percent to about 40 weight percent of co-blowing agent(s). More specifically, the blowing agent blend preferably includes from about 80 or 75 weight percent to about 50 weight percent of co-blowing agent(s).

For example, and in accordance with a preferred embodiment of the present invention, the blowing agent blend includes from about 30 weight percent to about 50 weight percent methyl formate, and from about 70 weight percent to about 50 weight percent co-blowing agent.

In accordance with yet another embodiment of the invention, the blowing agent blend includes about 5 to about 80 weight percent of methyl formate and about 20 to about 95 percent of at least one co-blowing agent selected from the group consisting of $C_2$ to $C_5$ hydrocarbon, a halogenated hydrocarbon, methanol, dimethyl ether, carbon dioxide, nitrogen and argon.

A nucleating agent or combination of such agents can be employed in the polymeric foaming formulation for advantages such as its capability for regulating cell formation, morphology, and performance characteristics of the foamed article. The amount of nucleating agent used depends upon the desired cell size, the selected blowing agent blend, and the desired foam density, and performance characteristics of the foamed article. The nucleating agent is generally added in amounts from about 0.02 to about 2 weight percent of the polymer resin formulation.

Some contemplated nucleating agents include inorganic materials (in small particulate form, preferably, with high aspect ratio (>20) and particle size in the micrometer to submicrometer or nanometer (nanoparticles) range), such as clay or nanoclay, talc, silica, and diatomaceous earth. For example, talc can be used from about 0.25 to about 2.0 weight percent of the polymer formulation. Other examples of nucleating agents include organic nucleating agents that decompose or react at the elevated temperatures to evolve gases, such as carbon dioxide and/or nitrogen. One example is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents can be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer). Talc can be added in a carrier or in a powder form.

If desired, a flame retardant can also be employed in the present invention. Non-limiting examples of flame retardants include bromine compounds, chloroparaffins and other chlorine compounds, antimony trioxide, and alumina trihydrates. Further, if desired, fillers, colorants, light and heat stabilizers, anti-oxidants, acid scavengers, processing aids, extrusion aids and foaming additives can be used in making the foam.

Gas permeation agents or stability control agents can be employed in the present invention to assist in preventing or inhibiting collapsing of the foam. The stability control agents suitable for use in the present invention can include the partial esters of long-chain fatty acids with polyols described in U.S. Pat. No. 3,644,230 to Cronin, saturated higher alkyl amines, saturated higher fatty acid amides, complete esters of higher fatty acids such as those described in U.S. Pat. No. 4,214,054 to Watanabe, and combinations thereof described in U.S. Pat. No. 5,750,584 to Knaus. The contents of each of the aforementioned patents is expressly incorporated herein by reference in its entirety.

The partial esters of fatty acids that can be used as a stability control agent include the members of the generic class known as surface active agents or surfactants. A preferred class of surfactants includes, but is not limited to, a partial ester of a fatty acid having 12 to 18 carbon atoms and a polyol having three to six hydroxyl groups. More preferably, the partial esters of a long chain fatty acid with a polyol component of the stability control agent is glycerol monostearate, glycerol distearate or mixtures thereof. It is contemplated that other gas permeation agents or stability control agents can be employed in the present invention to assist in preventing or inhibiting collapsing of the foam. However, in accordance with a preferred embodiment of the invention, no non-ionic fluorochemical surfactants are used.

Any of the variety of suitable extrusion system or other methods known in the art for dissolving blowing agent in polymers can be used in accordance with the present invention. One example of a suitable system and method includes, for example, a conventional two-extruder tandem system with each extruder having a single screw. Alternatively, a two-extruder tandem system in which the primary extruder is a twin screw, and the secondary extruder is a single screw can be used for extruding the expandable formulation of the present invention. A single extruder with proper cooling can also be employed in the present invention.

According to one process of the present invention, polyolefin pellets are admixed with a nucleating agent, such as talc. These materials are continuously fed into a hopper of an extruder. The feed mixture is conveyed forward by a screw within a barrel of the extruder as the components are mixed, compressed, heated, and converted to molten form. The conversion to molten form occurs prior to reaching an injection zone where the blowing agent is added. The blowing agent(s) of the present invention can be injected into the polymer formulation at a point where the polymer is in a melt state (i.e., beyond the feed zone). Each of the components of the blowing agent blend can be individually injected, either sequentially or simultaneously and in any order, into the polymer melt. Alternatively, the components of the blowing agent blend can be pre-mixed and the blend injected into the polymer melt. A homogeneous solution of two or more components can, at times, form an azeotropic mixture, which retains the same composition in the vapor state as in the liquid state when distilled or partially evaporated under a certain pressure. An azeotrope can be a "minimum boiling azeotrope", where the boiling temperature of the solution is less than that of the pure components, or a "maximum boiling azeotrope", where the boiling temperature of the solution is higher than that of the components. According to one embodiment, the blowing agent blend can be either a minimum or maximum boiling azeotropic mixture or a non-azeotropic mixture regardless of whether the components of the blend are injected separately or pre-mixed and then injected. If a two-extruder tandem system is used, the blowing agent(s) can be injected either in the primary or the secondary extruder or some components of the formulation can be injected in the primary extruder and the remaining components in the secondary extruder.

After injecting the blowing agent, the various components in the extruder are continuously mixed to ensure a homogeneous solution of the polymer and the blowing agent. The molten solution is then conveyed into a cooling zone where additional mixing takes place. After cooling, the solution is extruded into a holding zone maintained at a temperature and pressure that prevents or inhibits foaming of the solution. The holding zone has (a) an outlet die having an orifice opening into a zone of lower pressure such as atmospheric pressure, (b) means for closing the orifice without disturbing the foamable formulation within the holding zone, and (c) opening means for allowing the foamable solution to be ejected from the holding zone. An example of a holding zone is described in U.S. Pat. No. 4,323,528 to Collins, the contents of which are incorporated by reference herein. Regardless of whether a holding zone is used, the solution is then is extruded through a die into a lower pressure zone, such as atmospheric pressure. On exit, the extrudate is either allowed to foam or is immediately quenched to low temperatures (e.g., by contacting the extrudate with a heat exchange fluid such as water) and the solidified extrudate is chopped into small beads that can be expanded into foam structure at a later time if desired.

Figure 1:
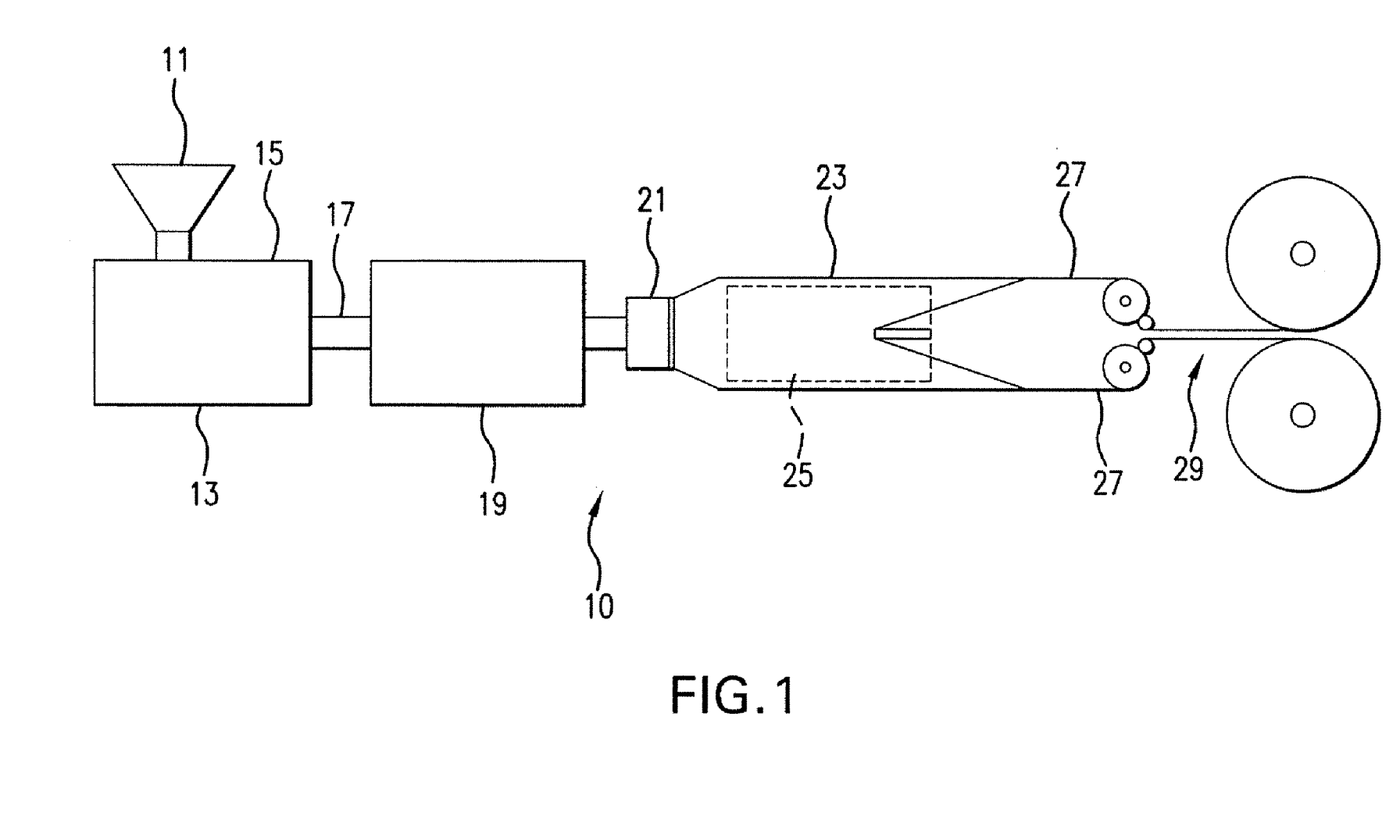
FIG. 1 is a schematic flow diagram of an overall sequence of operations involved in the manufacture of an extruded foam sheet according to one embodiment of the present invention.
Figure 2:
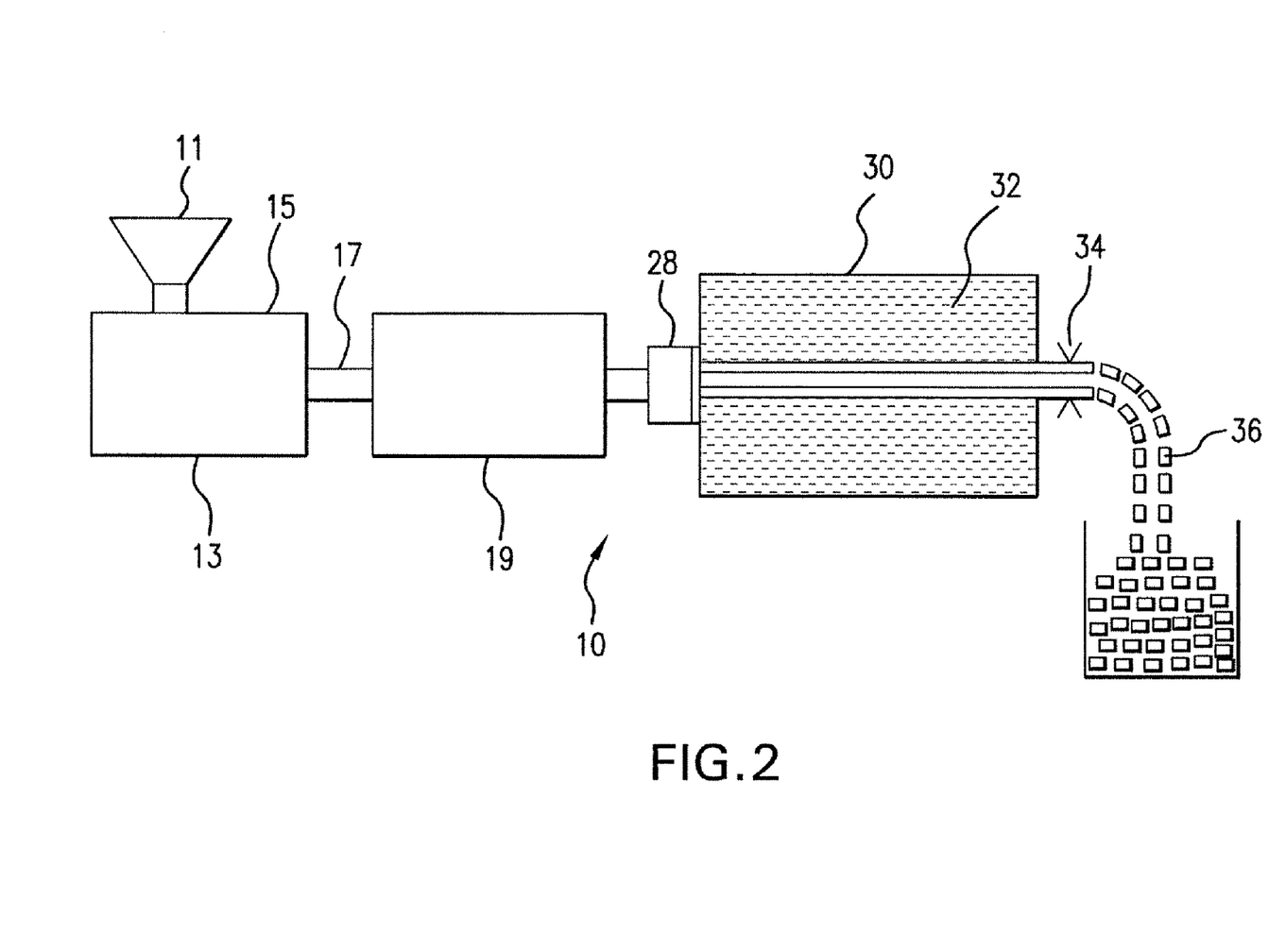
FIG. 2 is a schematic flow diagram of an overall sequence of operations involved in the manufacture of expandable beads according to one embodiment of the present invention.

According to one embodiment as applied to polyolefins such as polypropylene, a two-extruder tandem system 10 can be used for extruding a foam article (e.g., a sheet) of the present invention as depicted in FIG. 1, or for making expandable beads as depicted in FIG. 2. Polymer resin pellets are mixed with one or more additives (e.g., a nucleating agent) to form a feed mixture which is fed continuously into a hopper 11 of a primary extruder 13. The feed mixture is conveyed forward by a helical screw within the barrel of the primary extruder as the feed components are mixed, compressed, heated, and melted prior to reaching the blowing agent-injection zone. The blowing agent is added at point 15. Thus, the blowing agent of the present invention is injected at a point beyond the feed zone where the polymer exists in the melt state. If desired, the blowing agent can be injected at other locations beyond the feed zone, including into the secondary extruder.

Following injection of the blowing agent, the components are continuously mixed in the primary extruder 13. The exit pressure of the primary extruder 13 of the exemplary embodiment is generally in the range of from about 2000 to about 4000 psi. The temperature of the melt exiting the primary extruder 13 of the exemplary embodiment is generally in the range of from about 400 to about 500° F. The mixture is subsequently passed, at a high enough pressure that the blowing agent remains in solution, through a hollow adapter section 17 into a cooled secondary tandem extruder 19. The molten is mixture is passed along the length of the cooled secondary extruder at low shear where cooling and additional mixing occur. The exit pressure of the secondary extruder 19 of the exemplary embodiment is generally in the range of from about 300 to about 1500 psi. The temperature of the extrudate from the secondary extruder 19 of the exemplary embodiment is generally in the range of from about 300 to about 340° F. In general, the temperature of the primary extruder should be sufficient to melt the polymer and any organic additives, and to promote efficient mixing. The temperature and pressure in the secondary extruder should be sufficient to maintain a homogeneous solution of the components in the melt state. It is understood that the temperatures, pressures and other conditions can vary depending on the properties of the polymer used in the process. The specific conditions to be used are apparent to a person of skill in the art.

As seen in FIG. 1, for making foam sheet, the melt is then expressed through an annular die 21 in a low pressure zone in the form of an elongated bubble or tube 23, and the foamed polymer is drawn over a cylindrical surface of a cooling and sizing drum 25, and slit to form sheet stock 27, which is taken up on one or more winding reels 29.

To further augment the mechanical, aesthetic, and other characteristics of the foam, the foamed sheet can be laminated with a film of solid, unfoamed polymer, where the polymer comprising the film can be the same polymer as that comprising the foam or a different polymer. The film can be applied by melt extruding the film-forming polymer or by heat-welding the film onto the sheet. The film can be applied on one or both surfaces, and can be applied either on-line to the sheet stock 27 before it is wound up as rolls 29 or by taking the roll 29 and applying the film in a separate process. The thickness of the film is generally from 1 to 25% of the thickness of the foam sheet, depending on the properties desired in the final product. The film can be comprised of a single layer or multiple layers and can contain nanoparticles such as, for example, nanoclays to further augment the aesthetics, mechanical properties, and gas-barrier properties of the film/foam structure.

Alternatively, as shown in FIG. 2, for making expandable polymeric beads, the melt is expressed through a strand or rod die 28 into a low temperature zone 30 containing a heat transfer fluid 32 such as water. In this manner, the molten solution solidifies into strands, usually about 0.1 inch in diameter, without undergoing any expansion or foaming. The continuous strands then go through chopper 34 or any other cutting apparatus, and are cut into pellets (typically 0.1 inch× 0.1 inch) to form the so-called expandable beads 36. It should be noted that a die other than a strand or rod die can be used to make expandable formulation in shapes other than beads.

In another embodiment, instead of using the continuous melt process as described in FIG. 2, the expandable beads can be prepared with the blowing agent by exposing polymer pellets in the solid state to the blowing agent in a pressure vessel for a time until the desired solubility is attained. This saturation step can be carried out at a slightly elevated temperature to accelerate the impregnation of the blowing agent into the solid pellets. However, the temperature should not be too high to allow the impregnated pellets to stick together. In yet another method, the impregnation of the blowing agent can be accomplished by performing the polymer synthesis in the presence of the blowing agent, so as to dissolve, impregnate or entrap the blowing agent in the polymer.

Figure 3:
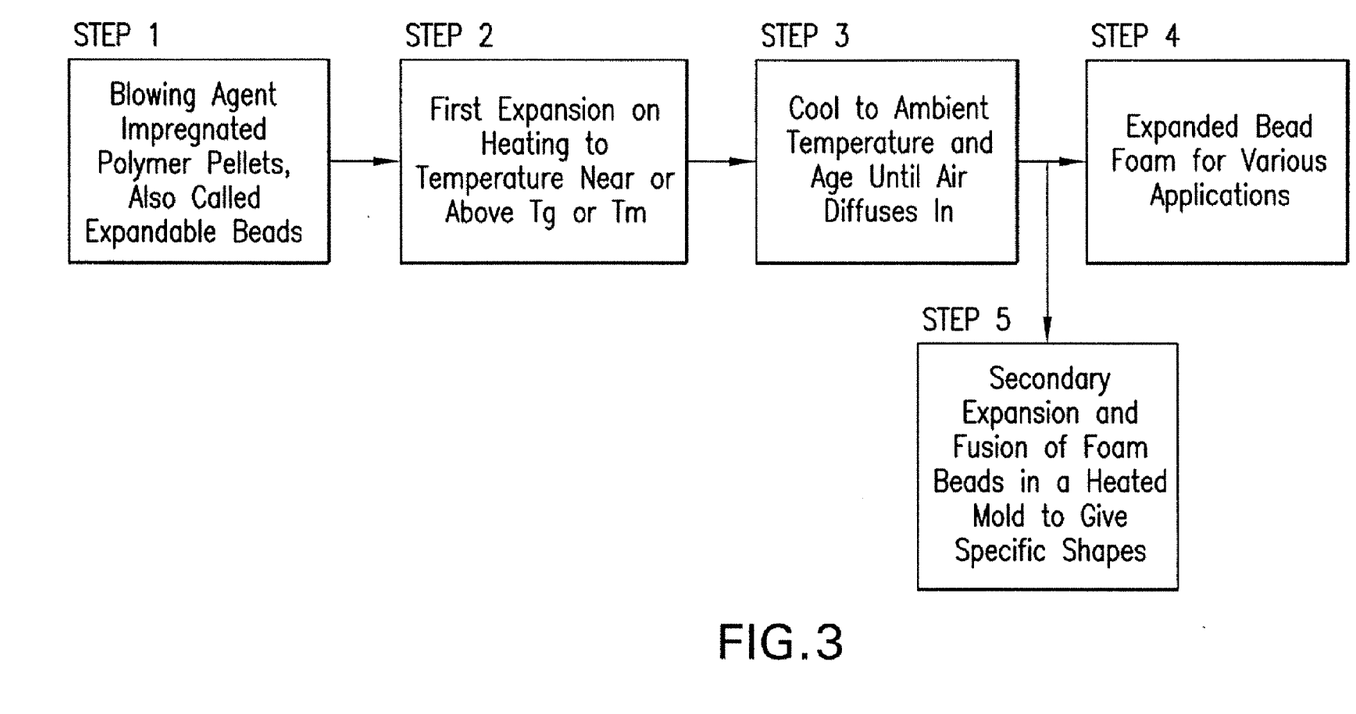
FIG. 3 is a schematic diagram of an overall sequence of operations involved in the manufacture of foam beads and articles made therefrom according to one embodiment of the present invention.

The expandable beads produced by any of the methods are then foamed as shown in FIG. 3, Step 2, by rapidly heating the beads to a temperature near or above the Tg of the polymer-blowing agent system or to a temperature near or above the Tm of the polymer-blowing agent system, e.g., by contacting the impregnated pellets with a heat exchange fluid such as high heat-content steam or a hot salt bath. The impregnated pellets can also be foamed at temperatures at or below Tm by applying mechanical pressure (compressive stress) to induce nucleation and growth of the cells as described in U.S. Pat. No. 6,080,798, the contents of which are incorporated by reference herein. Regardless of the method used, the beads undergo rapid expansion to form foam beads (Step 2), which then undergo ambient aging (Step 3), for example by cooling the beads to ambient temperature, to allow air to diffuse into the foamed beads to stabilize the dimensions. These beads can be used as such, for example for loose fill packaging, as shown in Step 4. Alternatively, the expanded and aged beads can be fused together in a heated mold as shown in Step 5, to form products of any of a variety of different shapes such as cups, plates, molded packaging, containers, planks or boards. Further density reduction occurs during the molding operation with air and the residual blowing agent in the expanded bead providing further expansion.

Figure 4:
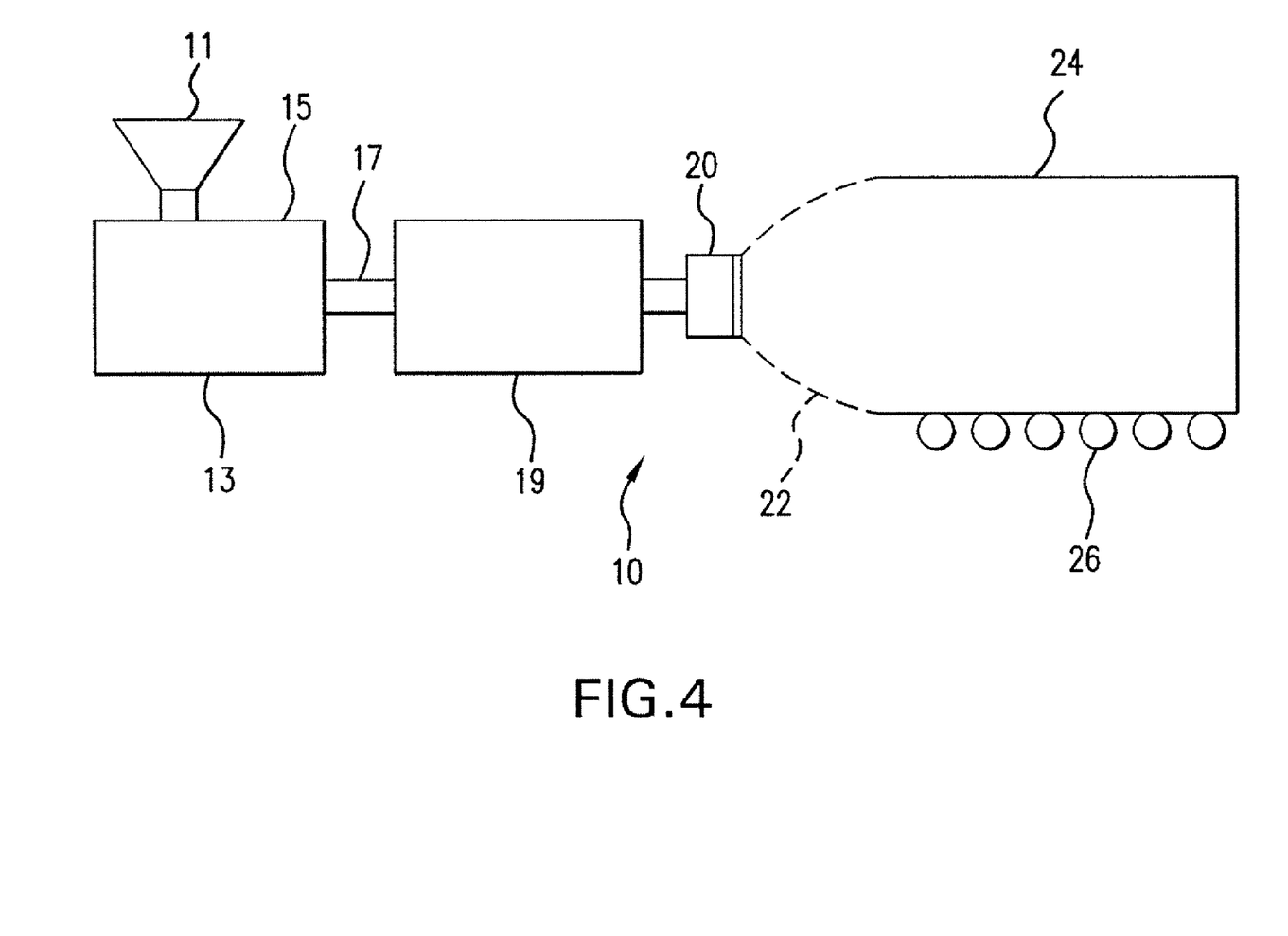
FIG. 4 is a schematic flow diagram of an overall sequence of operations involved in the manufacture of an extruded foam board or plank according to one embodiment of the present invention.

In yet another configuration, as shown in FIG. 4, the foamable formulation is expressed through a die of a different configuration such as a flat die 20 and allowed to expand in the form of a board or plank 24. The expanding extrudate 22 is moved forward by a set of rollers 26, and can be further directed to a shaping device before emerging as a board or plank 24.

Depending upon the materials and process used, the resulting foam article can be a bead, a sheet, a board, a plank, or the like. The foam beads can be further molded to form a sheet, plank or board, or into articles of various shapes, sizes, and thickness. If the article produced is a sheet, the thickness of the sheet can be up to about 0.5 inch. If the article produced is a plank or a board, the thickness is generally equal to or greater than about 0.5 inch, preferably between 0.5 inch and 3 inches.

For preparation of polyolefin foam sheets, the use of an annular die is preferred. The articles produced by extrusion through an annular die are generally less than about 0.5 inch in thickness, preferably from about 0.030 to about 0.5 inch in thickness. Such foamed sheets are particularly useful as protective wrapping material. For preparation of polyolefin foam boards, the use of a flat die is preferred. The articles produced by extrusion through a flat die are generally about 0.5 to about 3 inch in thickness. Such boards have particular utility as insulating, protective cushioning, or flotation materials. Regardless of the type of die used or the foam produced, the extruded foam can be subjected to further expansion or density reduction by application of heat and/or vacuum.

The foam beads, sheets, and boards or planks can be used as such, cut into other shapes, further shaped or formed by application of heat and pressure, or otherwise machined or formed into shaped articles of desired size and shape as known in the art.

Depending upon the materials and process used, the resulting foamed article generally has a density from about 1 to about 15 lb/ft$^3$, with further density reduction achieved via secondary expansion by application of heat and/or vacuum. This is typically seen in foamed beads where densities less than 1.0 lb/ft$^3$ are achieved. A foamed sheet typically has a density from about 1.0 to about 9.0 lb/ft$^3$, while a foamed board typically has a density of about 1.5 to about 9.0 lb/ft$^3$. In accordance with a preferred embodiment of the invention, the resulting foamed article or foamed structure has a substantially uniform density throughout. For example, the resulting foamed article or structure of the present invention preferably does not have a density gradient, as is typically created, for example, when quenching a foam sheet or board and/or chilling the foam surface to produce a skinned surface. Preferably, the foam is allowed to expand such that the density is substantially uniform through the foam structure.

Furthermore, and in accordance with one preferred embodiment of the invention, the resultant foamed article has a substantially closed-cell structure and is defined herein as a foam having greater than about 85% closed cells and, more typically, greater than about 95% closed cells. Alternatively, and in accordance with another aspect of the invention, the resultant foamed article can be formed with 15% or more open cells, for example 20%, 25%, 30% or more open cells. Furthermore, the resulting foam structure can be controlled to include at least about 10, 15, 20, 25, 30, 35 or 40 cells per inch.

The foams of the present invention can be used for insulation or as building materials, in various containers and packaging systems, or as protective or flexible packaging. Generally, extruded foam sheets are used in flexible as well as rigid packaging; extruded foam planks are used in protective packaging, and foam beads are used for loose fill packaging, or are molded as sheets or planks or boards or contoured articles for flexible, protective, rigid, and insulation applications. In addition to foam sheets, planks and boards, the present invention can take the form of other shapes such as rods, tubes or contoured members.

Other uses for the foams of the present invention, as well as suitable processes, apparatus, equipment, devices and systems for the preparation thereof are described in United States patents and published Applications U.S. Pat. No. 6,136,875 to Wu; U.S. Pat. No. 5,149,473 to LeDuc; U.S. Pat. No. 6,476,080 to Duffy, U.S. Pat. No. 6,599,946 to Duffy, U.S. Pat. No. 6,696,504 to Hayashi, US 2004/0132844 to Francis; and US 2004/0006149 to Handa, the contents of each of which are incorporated by reference herein.

Dimensional stability is usually expressed in terms of % gauge change, which equals 100×(aged gauge−initial gauge)/initial gauge, with initial gauge determined within 15 minutes of extrusion. The resulting foam of the present invention is desirably "dimensionally stable" in that the gauge of the foam after 7 days of aging does not change by more than about 15%, preferably not more than 10%, and more preferably not more than 5% from the gauge of the freshly extruded foam. Preferably, the foams of the invention have a dimensional change of less than about 4%, more preferably less than about 1% in any direction.

The following examples are presented in order to more fully illustrate certain embodiments of the invention. These examples in no way, however, should be construed as limiting the broad scope of the invention. One skilled in the art can readily devise many variations and modifications of the principles disclosed herein without departing from the scope of the invention.

EXAMPLES

Various blowing agents were tested with the results shown below in Table 1. Specifically, various polypropylene foam sheets were made from a comparative blowing agent and inventive blowing agents in accordance with the extrusion process generally described herein. It should be noted that for the various examples reported in Table 1, each exemplary foam was made with the same polymer and the same hardware operated in exactly the same way; the only variable being the blowing agent. All of the inventive blowing agents included methyl formate; the comparative blowing agent did not include methyl formate.

Each of the polyolefin foams was made on a tandem extrusion line employing 2.5 inch and 3.5 inch single screw extruders and blowing agent was injected through a single port in the primary extruder. The polymer resin used was Basell's high melt strength polypropylene with a specified density of 0.91 g/cm$^3$ and a melt flow rate of 1.9. In addition to the blowing agents and the polyolefin resin, talc was added in the amount of up to 1.64 weight percent of the total foaming formulation including all the blowing agent(s), polymer resin(s), and additives. An annular die was used and the expanding extrudate was directed to a shaping system to form foam sheets. An example of suitable equipment for preparing polymer foam sheets is described in U.S. Pat. No. 6,136,875, the contents of which are incorporated by reference herein.

TABLE 1

| | Example | | | | |
|---|---|---|---|---|---|
| | Comp | Inv1 | Inv2 | Inv3 | Inv4 |
| Polypropylene (weight percent)[1] | 96.49 | 95.71 | 95.32 | 96.54 | 95.59 |
| Isobutane (weight percent)[1] | 2.69 | 1.54 | 0.80 | 0 | 0 |
| Methyl Formate (weight percent)[1] | 0 | 1.57 | 2.24 | 2.15 | 2.99 |
| $CO_2$ (weight percent)[1] | 0 | 0 | 0 | 0.35 | 0 |
| Isobutane (weight percent)[2] | 100 | 49.5 | 26.3 | 0.0 | 0.0 |
| Methyl Formate (weight percent)[2] | 0 | 50.5 | 73.7 | 86.0 | 100 |
| $CO_2$ (weight percent)[2] | 0 | 0 | 0 | 14.0 | 0 |
| Talc (weight percent)[1,3] | 0.82 | 1.18 | 1.64 | 0.96 | 1.42 |
| Extrusion Output Rate (lb/hr) | 145 | 145 | 144 | 144 | 147 |

TABLE 1-continued

|  | Example | | | | |
| --- | --- | --- | --- | --- | --- |
|  | Comp | Inv1 | Inv2 | Inv3 | Inv4 |
| Die Pressure (psi) | 560 | 520 | 550 | 570 | 520 |
| Die Melt Temperature (° F.)[4] | 327 | 329 | 327 | 329 | 330 |
| Fresh Gauge (mil)[5] | 90 | 101 | 92 | 91 | 96 |
| Fresh Density (lb/ft$^3$)[5] | 6.55 | 6.29 | 6.33 | 6.27 | 6.46 |

Comp—comparative example; Inv—inventive example
[1]weight percent = 100 × weight of a component/weight of (resin + blowing agents + talc).
[2]weight percent = 100 × weight of a blowing agent component/(total weight of blowing agent blend)
[3]Talc used was a masterbatch containing 50 weight percent polystyrene.
[4]The temperature just before the foaming formulation enters the die.
[5]Fresh measurements made within 15 minutes of extrusion.

All of the above foams of Table 1 were dimensionally stable because after having undergone aging for 7 days, the absolute percent gauge change was less than about 15%. It was found that after 7 days all of the foams in Table 1 showed post-extrusion growth of up to 11% except for the foam made using the co-blowing agent $CO_2$ that showed an initial post-extrusion shrinkage followed by recovery to within 5% of the fresh gauge. It should be noted that the dimensional stability can be further improved by using stability control agents or gas permeation modifiers as described in U.S. Pat. No. 3,644,230 to Cronin; U.S. Pat. No. 4,214,054 to Watanabe; and U.S. Pat. No. 5,750,584 to Knaus, each of which is incorporated herein by reference. The formulations described herein provide stable foam structures produced by an environmentally friendly and cost-effective process. Furthermore, a variety of foams having suitable and desired characteristics can be formed in accordance with the present invention. Inventive formulations 1 to 4 include components with reduced and likely negligible impact on air quality, and demonstrate how foam sheet (and, by extension, expanded beads) with similar characteristics can be made using formulations with reduced or no use of hydrocarbon VOC blowing agent. Consequently, partial or complete replacement of the VOC blowing agent with methyl formate leads to a significant reduction in VOC emissions during the extruded foam sheet or board formation, expanded bead formation (FIG. 3, Step 2) and molding (FIG. 3, Step 5) operations, and from post-manufacturing operations such as foam or product storage.

Furthermore, it should be noted that the total number of moles of the blowing agent in the various formulations in Table 1 is about the same (ranging from 0.044 to 0.053 moles per 100 g of total material processed), so as to provide foams with substantially the same density. It will be obvious to one skilled in the art that foams with lower densities can be obtained by changing the composition of the blowing agent blend and making it rich in the component(s) with higher volatility, and that the density can be further reduced by using more moles of the blowing agent. Each of the inventive formulations of Table 1 produce a foam that is stable and easy to manufacture and handle. The average open cell content in the foams reported in Table 1 is about 32%, which can be further increased or decreased by adjusting the die melt temperature or the melt rheology or both. The foam sheets reported in Table 1 were semi-rigid, corrugation free, and after aging for 7 days, were thermoformed into trays. The finished, thermoformed products had a density about 30% lower relative to the fresh density and a gauge about 20% higher relative to the fresh gauge.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. An expandable bead for the preparation of a dimensionally stable polyolefin foam structure, the expandable bead including a polyolefin and a blowing agent, the blowing agent comprising about 5 to about 80 weight percent of methyl formate and about 20 to about 95 weight percent of one or more $C_2$ to $C_5$ hydrocarbons, wherein the blowing agent is substantially miscible with the polymer, and wherein the polyolefin foam structure has an absolute percent gauge change less than about 15 percent after aging up to 7 days.

2. The expandable bead of claim 1, wherein the blowing agent comprises at least one additional co-blowing agent.

3. The expandable bead of claim 1, wherein the blowing agent comprises greater than about 50 weight percent of methyl formate.

4. The expandable bead of claim 2, wherein the at least additional one co-blowing agent is selected from the group consisting of an inorganic agent, a hydrocarbon, a halogenated hydrocarbon, an ether, an ester, an acetal, an alkanol, a carbonate, an amine, a ketone, a chemical foaming agent, and any combination thereof.

5. The expandable bead of claim 1, wherein the polyolefin includes polyethylene, polypropylene, or a combination thereof.

6. The expandable bead of claim 1, wherein the polyolefin foam has a density of about 1 to 15 lb/ft$^3$.

7. The expandable bead of claim 1, wherein the polyolefin foam structure is a substantially closed-cell structure.

8. A dimensionally stable polyolefin foam structure prepared by a process including:
    preparing expandable beads, the beads including a polyolefin and a blowing agent, the blowing agent comprising about 5 to about 80 weight percent of methyl formate and about 20 to about 95 weight percent of one or more $C_2$ to $C_5$ hydrocarbons; and
    expanding the expandable beads to form the polyolefin foam structure,
    wherein the blowing agent is substantially miscible with the polyolefin, and wherein the polyolefin foam structure has an absolute percent gauge change less than about 15 percent after aging up to 7 days.

9. The polyolefin foam structure of claim 8, wherein the expandable beads are formed by a process selected from the group consisting of (a), (b), and (c):
    a. (i) melting a polyolefin;
        (ii) dissolving an effective amount of the blowing agent in the polyolefin to define a mixture; and
        (iii) extruding the mixture to form the expandable beads;
    b. dissolving an effective amount of the blowing agent into the polyolefin beads;
    c. synthesizing the polyolefin in the presence of the blowing agent.

10. The polyolefin foam structure of claim 8, wherein the step of expanding the beads includes:
    heating the beads to a temperature at least at or above the glass transition temperature of the polymer-blowing agent system; or
    subjecting the beads to an external compressive stress at a temperature up to the glass transition or crystal melt temperature of the polymer-blowing agent system.

11. The polyolefin foam structure of claim 8, wherein the expanded beads are further molded into a contoured shape.

12. The polyolefin foam structure of claim 8, wherein the blowing agent comprises at least one additional co-blowing agent.

13. The polyolefin foam structure of claim 8, wherein the blowing agent comprises greater than about 50 weight percent of methyl formate.

14. The polyolefin foam structure of claim 12, wherein the at least one additional co-blowing agent is selected from the group consisting of an inorganic agent, a hydrocarbon, a halogenated hydrocarbon, an ether, an ester, an acetal, an alkanol, a carbonate, an amine, a ketone, a chemical foaming agent, and any combination thereof.

15. The polyolefin foam structure of claim 8, wherein the polyolefin foam has a density of about 1 to 15 lb/ft$^3$.

16. The polyolefin foam structure of claim 8, wherein the polyolefin foam structure is a substantially closed-cell structure.

17. A process for making a dimensionally stable polyolefin foam structure including:
    preparing expandable beads, the beads including a polyolefin and a blowing agent, the process comprising, melting a polyolefin, and dissolving an effective amount of the blowing agent in the polyolefin, the blowing agent being substantially miscible with the polyolefin and the blowing agent comprising about 5 to about 80 weight percent of methyl formate and about 20 to about 95 weight percent of one or more $C_2$ to $C_5$ hydrocarbons;
    expanding the expandable beads to form the polyolefin foam structure, wherein the polyolefin foam structure has an absolute percent gauge change less than about 15 percent after aging up to 7 days.

18. The process according to claim 17, wherein the polyolefin structure is in the form of a sheet, board or plank.

19. The process according to claim 17, wherein the blowing agent comprises at least one additional co-blowing agent.

20. The process according to claim 17, wherein the blowing agent comprises greater than about 50 weight percent of methyl formate.

21. The process according to claim 19, wherein the at least one additional co-blowing agent is selected from the group consisting of an inorganic agent, a hydrocarbon, a halogenated hydrocarbon, an ether, an ester, an acetal, an alkanol, a carbonate, an amine, a ketone, a chemical foaming agent, and any combination thereof.

22. A dimensionally stable polyolefin foam board or plank prepared by a process including:
    melting a polyolefin;
    dissolving an effective amount of a blowing agent in the polyolefin to define a mixture, the blowing agent comprising about 5 to about 80 weight percent of methyl formate and about 20 to about 95 weight percent of one or more $C_2$-$C_5$ hydrocarbons;
    forming an extrudate from the mixture; and
    expanding the extrudate to form the polyolefin foam board or plank, wherein the blowing agent is substantially miscible with the polymer, and wherein the polyolefin foam board or plank has an absolute percent gauge change less than about 15 percent after aging up to 7 days.

23. The polyolefin foam board or plank of claim 22, wherein the blowing agent comprises greater than about 50 weight percent of methyl formate.

24. The polyolefin foam board or plank of claim 22, wherein the polyolefin includes polyethylene, polypropylene, or a combination thereof.

25. The polyolefin foam board or plank of claim 22, wherein the polyolefin foam has a density of about 1 to 15 lb/ft$^3$.

26. The polyolefin foam board or plank of claim 22, wherein the extrudate includes from about 1 to about 18 weight percent blowing agent.

27. The polyolefin foam board or plank of claim 22, wherein the polyolefin foam structure is a substantially closed-cell structure.

28. A process for making a dimensionally stable polyolefin foam board or plank comprising:
    melting a polyolefin;
    dissolving an effective amount of a blowing agent in the polyolefin to define a mixture, the blowing agent comprising about 5 to about 80 weight percent of methyl formate and about 20 to about 95 weight percent of one or more $C_2$-$C_5$ hydrocarbons;
    forming an extrudate from the mixture; and
    expanding the extrudate to form the polyolefin foam board or plank, wherein the blowing agent is substantially miscible with the polymer, and wherein the polyolefin foam board or plank has an absolute percent gauge change less than about 15 percent after aging up to 7 days.

29. The process of claim 28, wherein the blowing agent comprises greater than about 50 weight percent of methyl formate.

30. The process of claim 28, wherein the polyolefin foam has a density of about 1 to 15 lb/ft$^3$.

31. The process of claim 28, wherein the polyolefin foam structure is a substantially closed-cell structure.

32. The expandable bead of claim 5, wherein the blowing agent consists of methyl formate, isobutane, and carbon dioxide.

33. The polyolefin foam structure of claim 14, wherein the blowing agent consists of methyl formate, isobutane, and carbon dioxide.

34. The process of claim 21, wherein the blowing agent consists of methyl formate, isobutane, and carbon dioxide.

35. The polyolefin foam structure of claim 22, wherein the blowing agent consists of methyl formate, isobutane, and carbon dioxide.

36. A polyolefin foam sheet prepared by a process comprising:
    preparing an expandable polymeric formulation consisting essentially of a polyolefin polymer and a substantially miscible blowing agent, the blowing agent comprising about 5 to about 80 weight percent of methyl formate and about 20 to about 95 weight percent of one or more $C_2$ to $C_5$ hydrocarbons; and
    expanding the formulation to form a dimensionally stable polyolefin foam sheet.

37. The polyolefin foam sheet of claim 36, wherein preparing the expandable polymeric formulation comprises:
    melting a polyolefin polymer;
    dissolving an effective amount of the blowing agent in the polyolefin polymer to define the formulation;
    forming the formulation into an expandable extrudate.

38. The polyolefin foam sheet of claim 36, wherein the polyolefin foam sheet is thermoformable.

39. The polyolefin foam sheet of claim 36, wherein the blowing agent comprises at least one additional co-blowing agent.

40. The polyolefin sheet of claim 39, wherein the blowing agent consists of methyl formate, isobutane, and carbon dioxide.

41. The polyolefin sheet of claim 36, wherein the polyolefin sheet has an absolute percent gauge change less than about 15 percent after aging up to 7 days.

42. A process for producing a polyolefin foam sheet comprising:
   preparing an expandable polymeric formulation consisting essentially of a polyolefin polymer and a substantially miscible blowing agent, the blowing agent comprising about 5 to about 80 weight percent of methyl formate and about 20 to about 95 weight percent of one or more $C_2$ to $C_5$ hydrocarbons; and
   expanding the formulation to form a dimensionally stable polyolefin foam sheet.

43. The process of claim 42, wherein preparing the expandable polymeric formulation comprises:
   melting a polyolefin polymer;
   dissolving an effective amount of the blowing agent in the polyolefin polymer to define the formulation;
   forming the formulation into an expandable extrudate.

44. The process of claim 42, wherein the polyolefin foam sheet is thermoformable.

45. The process of claim 42, wherein the blowing agent comprises at least one additional co-blowing agent.

46. The process of claim 45, wherein the blowing agent consists of methyl formate, isobutane, and carbon dioxide.

47. The process of claim 42, wherein the polyolefin foam sheet has an absolute percent gauge change less than about 15 percent after aging up to 7 days.

48. The polyolefin foam board or plank of claim 22, wherein the mixture further comprises foaming additives.

49. The process of claim 28, wherein the mixture further comprises foaming additives.

50. The polyolefin foam sheet of claim 36, wherein the polymeric formulation includes a foaming additive.

51. The process of claim 42, wherein the polymeric formulation includes a foaming additive.

52. The expandable bead of claim 1, wherein the blowing agent further comprises carbon dioxide.

53. The polyolefin foam structure of claim 8, wherein the blowing agent further comprises carbon dioxide.

54. The process of claim 17, wherein the blowing agent further comprises carbon dioxide.

55. The polyolefin foam board or plank of claim 22, wherein the at least one co-blowing agent includes carbon dioxide.

56. The process of claim 28, wherein the at least one co-blowing agent includes carbon dioxide.

57. The polyolefin foam sheet of claim 36, wherein the blowing agent further comprises carbon dioxide.

58. The process of claim 42, wherein the blowing agent further comprises carbon dioxide.

59. The expandable bead of claim 1, wherein the blowing agent comprises about 50 to about 75 weight percent of methyl formate and about 25 to about 50 weight percent of one or more $C_2$-$C_5$ hydrocarbons.

60. The polyolefin foam structure of claim 8, wherein the blowing agent comprises about 50 to about 75 weight percent of methyl formate and about 25 to about 50 weight percent of one or more $C_2$-$C_5$ hydrocarbons.

61. The process of claim 17, wherein the blowing agent comprises about 50 to about 75 weight percent of methyl formate and about 25 to about 50 weight percent of one or more $C_2$-$C_5$ hydrocarbons.

62. The polyolefin foam board or plank of claim 22, wherein the blowing agent comprises about 50 to about 75 weight percent of methyl formate and about 25 to about 50 weight percent of $C_2$ to $C_5$ hydrocarbon.

63. The process of claim 28, wherein the blowing agent comprises about 50 to about 75 weight percent of methyl formate and about 25 to about 50 weight percent of one or more $C_2$-$C_5$ hydrocarbons.

64. The polyolefin foam sheet of claim 36, wherein the blowing agent comprises about 50 to about 75 weight percent of methyl formate and about 25 to about 50 weight percent of one or more $C_2$-$C_5$ hydrocarbons.

65. The process of claim 42, wherein the blowing agent comprises about 50 to about 75 weight percent of methyl formate and about 25 to about 50 weight percent of one or more $C_2$-$C_5$ hydrocarbons.

* * * * *